US011254617B2

(12) United States Patent
Saito et al.

(10) Patent No.: US 11,254,617 B2
(45) Date of Patent: Feb. 22, 2022

(54) INDIRECT ADDITIVE MANUFACTURING PROCESS USING AMINE-CONTAINING ADHESIVE POLYMERS

(71) Applicants: UT-Battelle, LLC, Oak Ridge, TN (US); The ExOne Company, North Huntingdon, PA (US)

(72) Inventors: Tomonori Saito, Knoxville, TN (US); Amy M. Elliott, Knoxville, TN (US); Daniel T. Brunermer, Leechburg, PA (US); Dustin Blake Gilmer, Kingsport, TN (US); Michelle Lehmann, Knoxville, TN (US); Huayun Yu, Delmont, PA (US)

(73) Assignees: UT-Battelle, LLC, Oak Ridge, TN (US); The ExOne Company, North Huntingdon, PA (US)

( * ) Notice: Subject to any disclaimer, the term of this patent is extended or adjusted under 35 U.S.C. 154(b) by 403 days.

(21) Appl. No.: 16/243,507

(22) Filed: Jan. 9, 2019

(65) Prior Publication Data

US 2020/0216363 A1  Jul. 9, 2020

(51) Int. Cl.
  *C04B 35/634* (2006.01)
  *B22F 3/10* (2006.01)
  (Continued)

(52) U.S. Cl.
  CPC ...... *C04B 35/63444* (2013.01); *B22F 1/0074* (2013.01); *B22F 3/1003* (2013.01);
  (Continued)

(58) Field of Classification Search
  CPC ... C04B 35/63444; C04B 35/64; C04B 35/14; C04B 2235/6026; C04B 2235/32;
  (Continued)

(56) References Cited

U.S. PATENT DOCUMENTS 5,490,882 A   2/1996   Sachs et al.
6,036,777 A   3/2000   Sachs
            (Continued)

FOREIGN PATENT DOCUMENTS

CN   105753361 A   7/2016

OTHER PUBLICATIONS

PubChem 3, N,-[2-[2-[2-[Bis(2-aminoethyl)amino]ethylamino]ethyl-[2-[bis[2-[bis(2-aminoethyl)amino]ethyl]amino]ethyl][jmino]ethyl] ethane-1,2-diamine, (Jun. 23, 2018) [retrieved Mar. 10, 2020] retrieved from internet URL: https:// )pubchem.ncbi.nim.gov/compound/134531463 (Year: 2018).*

(Continued)

*Primary Examiner* — Rebecca Janssen
(74) *Attorney, Agent, or Firm* — Scully, Scott, Murphy & Presser, P.C.

(57) ABSTRACT

A method for binder jetting additive manufacturing of an object, the method comprising: (i) separately feeding a powder from which said object is to be manufactured and a solution comprising an adhesive polymer dissolved in a solvent into an additive manufacturing device, wherein said adhesive polymer is an amine-containing polymer having a molecular weight of at least 200 g/mole and is present in said solution in a concentration of 1-30 wt % to result in said solution having a viscosity of 2-25 mPa·s and a surface tension of 25-45 mN/m at room temperature; and (ii) dispensing selectively positioned droplets of said adhesive polymer, from a printhead of said additive manufacturing device, into a bed of said powder to bind particles of said powder with said adhesive polymer to produce a preform having a shape of the object to be manufactured.

21 Claims, 5 Drawing Sheets

(51) Int. Cl.
*B22F 1/00* (2006.01)
*C04B 35/64* (2006.01)
*B33Y 10/00* (2015.01)
*B22F 10/10* (2021.01)
*C04B 35/14* (2006.01)
*B22F 12/00* (2021.01)
*B33Y 70/00* (2020.01)

(52) U.S. Cl.
CPC .............. *B22F 12/00* (2021.01); *C04B 35/14* (2013.01); *C04B 35/64* (2013.01); *B22F 10/10* (2021.01); *B22F 2301/35* (2013.01); *B22F 2998/00* (2013.01); *B33Y 10/00* (2014.12); *B33Y 70/00* (2014.12); *C04B 2235/32* (2013.01); *C04B 2235/3418* (2013.01); *C04B 2235/6026* (2013.01); *C04B 2235/6567* (2013.01); *C04B 2235/96* (2013.01)

(58) Field of Classification Search
CPC .... C04B 2235/3418; C04B 2235/6567; C04B 2235/96; C04B 35/6269; C04B 35/01; C04B 35/515; B22F 12/00; B22F 3/1003; B22F 1/0074; B22F 10/10; B22F 2998/00; B22F 2301/35; B22F 3/1021; B33Y 10/00; B33Y 70/00; B33Y 40/20; Y02P 10/25; C22C 33/02; C22C 1/0433; C22C 1/0458; C22C 1/0425; C22C 1/0416; C22C 1/0483; C22C 1/045
See application file for complete search history.

(56) References Cited

U.S. PATENT DOCUMENTS

| | | |
|---|---|---|
| 7,287,587 B2 | 10/2007 | Reddy et al. |
| 8,465,777 B2 | 6/2013 | Wang et al. |
| 10,040,216 B2 | 8/2018 | Bai et al. |
| 2005/0003189 A1 | 1/2005 | Bredt et al. |
| 2006/0270748 A1 | 11/2006 | Sommerlade et al. |
| 2015/0069649 A1 | 3/2015 | Bai et al. |
| 2016/0083589 A1 | 3/2016 | Ganapathiappan et al. |
| 2016/0332367 A1 | 11/2016 | Sun et al. |
| 2017/0203514 A1 | 7/2017 | McCoy et al. |
| 2018/0236544 A1* | 8/2018 | Benn .................... B22F 1/0062 |
| 2018/0360033 A1* | 12/2018 | Naruse .................... C08F 20/34 |
| 2019/0111618 A1 | 4/2019 | Saito et al. |
| 2019/0176387 A1* | 6/2019 | Kuno .................... B29C 64/393 |

OTHER PUBLICATIONS

Vaezi et al., Effects of Layer Thickness and Binder Saturation Level Parameters on 3D Printing Process Int J Adv Manuf Technol (2011) 53:275-284 (Year: 2011).*

Sigma-Aldrich. "Triethlyene Glycol Dimethacrylate T5537." Apr. 11, 2016, https://web.archive.org/web/20160411054245/https://www.sigmaaldrich.com/catalog/substance/triethyleneglycoldimethacrylate2863210916011?lang=en&region=US. Retrieved on Sep. 16, 2019]. Retrieved from: https://archive.org/web/ (Year: 2016).

United States Office Action dated Oct. 11, 2019 issued in U.S. Appl. No. 15/783,574.

Office Action dated Feb. 21, 2020 received in U.S. Appl. No. 15/783,574.

Vaezi M. et al., "Effects of Layer Thickness and Binder Saturation Level Parameters on 3D Printing Process", Int J Adv Manuf Technol 53:275-284 (2011).

Pubchem, N'-[2-[2-[2-[Bis(2-aminoethyl)amino]ethylamino]ethyl-[2-[bis[2-[bis(2-aminoethyl)amino]ethyl]amino]ethyl]amino]ethyl]ethane-1,2-diamine, (Jun. 23, 2018) [retrieved Mar. 10, 2020] retrieved from internet URL: https://pubchem.ncbi.nim.gov/compound/134531463.

International Search Report and Written Opinion dated Apr. 2, 2020 received in International Application No. PCT/US20/12668.

Meseguer, J., et al., "Thermal Radiation Heat Transfer", Spacecraft Thermal Control, 2012, pp. 73-86, doi: 10.1533/9780857096081.73.

Office Action dated Oct. 14, 2020 received in U.S. Appl. No. 15/783,574, 23 pages.

Esterman, M. "Characterization of the Powder/Binder Interaction in the Three Dimensional Printing Process," Submitted to the Department of Mechanical Engineering in Partial Fulfillment of the Requirements for the Degree of Master of Science at the Massachusetts Institute of Technology, (Aug. 24, 1990), 159 pages.

* cited by examiner

INDIRECT ADDITIVE MANUFACTURING PROCESS USING AMINE-CONTAINING ADHESIVE POLYMERS

This invention was made with government support under Prime Contract No. DE-AC05-00OR22725 awarded by the U.S. Department of Energy. The government has certain rights in the invention.

FIELD OF THE INVENTION

The present invention relates generally to additive manufacturing processes, and more particularly, to binder jetting) additive manufacturing processes for constructing a host of three-dimensional objects. The present invention further relates to amine-containing adhesive binders for use in binder jetting additive manufacturing processes.

BACKGROUND OF THE INVENTION

Additive manufacturing (AM) is a growing technology that has the potential to significantly impact product realization in aerospace, automotive, and medical industries, among others. Metal AM processes have been largely based on direct powder bed fusion processes, such as selective laser sintering (SLS), selective laser melting (SLM), and electron beam melting (EBM). Although capable, direct fusion processes are hindered by several shortcomings, including thermal stresses within the printed parts, operator burden in completing the build process, and overall cost of the equipment. Furthermore, developing process parameters for new materials in powder bed fusion processing tends to be difficult.

Due to these challenges in direct AM processes, binder jetting 3D printing has increasingly been considered as a more attractive alternative. Binder jetting 3DP is often integrated with inkjet technology to deposit a binder into a powder bed of metal. The layers of the metal part are adhered together by the binder, one layer at a time to produce an initial "green" version of the object. The "green" part may then be cured in a low temperature oven and then sintered and infiltrated in a high temperature oven. Binder jetting 3DP can create geometries from a variety of materials without the need for costly direct heat processes, such as lasers or electron beams. By using inkjet printing in the forming process, the layers of the part can be created rapidly, at high resolution and at competitive cost.

Binder jetting 3DP has advantages over powder-bed fusion processes in the areas of cost, processing of new materials, and thermal stresses within the printed parts. First, due to the utilization of inkjet instead of expensive lasers or electron beams during the forming process, the equipment, maintenance, and operation of binder jetting 3DP is much less resource-consuming than its SLS, SUM and EBM counterparts. Furthermore, since heat is not used in the forming process, reactive materials that would be hazardous to process via SUM or EBM can be shaped via binder jetting 3DP. Finally, since the post-print sintering and infiltration occur in an oven and at an even distribution throughout the part, residual stresses due to thermal gradients within the part are avoided. Therefore, geometries can be manufactured via binder jetting 3DP without the need for post-thermal processing.

Nevertheless, several challenges face binder jetting 3DP, including subpar green part strength, scalability, and overall cost of the process. Moreover, the binder jetting additive methods of the art may produce cured parts that lack sufficient green strength. The sub-standard mechanical strength of the cured parts may result in breakage or deformation before the part is used or before it is sintered.

SUMMARY OF THE INVENTION

The present disclosure is directed to methods for producing objects of any of a variety of shapes by a binder jetting additive manufacturing process (also known as a "binder jetting process") in which an adhesive binder is used to form an initial preform that may be cured and/or sintered to form a final bonded object. The process disclosed herein represents a significant advance in the art of binder jetting processing at least for the reason that the process produces green parts with substantial resilience, and does this in the same or less time and cost than that required in conventional binder jetting processes.

The present disclosure is particularly directed to a binder jetting additive manufacturing process that includes the following steps: (i) separately feeding a powder from which the object is to be manufactured and a solution containing an adhesive polymer dissolved in a solvent (wherein "solvent" may be a single solvent or a mixture (i.e., solution of two, three, or more solvents) into an additive manufacturing device, wherein the adhesive polymer is an amine-containing polymer having a molecular weight of at least 200 g/mole and is present in the solution in a concentration of 1-30 wt % to result in the solution having a viscosity of 2-25 mPa·s and a surface tension of 25-45 mN/m at room temperature; and (ii) dispensing selectively positioned droplets of the adhesive polymer, from a printhead of the additive manufacturing device, into a bed of the powder to bind particles of the powder with the adhesive polymer to produce a preform having a shape of the object to be manufactured. Some of the advantages of the process described herein include: (1) the adhesive binder can be used within a wide range of saturations without causing weeping or loss of shape in the print, and this permits one to tailor the strength of the green part; (2) the binder is water-soluble, even after print (thus, in applications such as wash-out tooling, the process can produce stronger parts); (3) a lower amount of adhesive polymer can be used to achieve an exceptional level of equal green part strength, while at the same time providing lower off-gassing and a lower amount of carbonaceous residue after being sintered; and (4) the hinder provides enhanced green part strength especially with a low content of binders.

BRIEF DESCRIPTION OF THE FIGURES

FIGS. 2A-2B.

FIGS. 4A-4B.

DETAILED DESCRIPTION OF THE INVENTION

The powder used in the binder jetting processes described herein can be composed of any solid material desired as the construction material of the object being produced. The powder can be sinterable or non-sinterable. As well known in the art, a powder is sinterable if it can form a solid cohesive (sintered) mass when subjected to a suitably high temperature without melting the powder. The particles of the powder can have any suitable particle size. The particles can be, for example, nanoparticles (e.g., at least 1, 2, or 5 nm and up to 10, 20, 50, 100, 200, or 500 nm), or microparticles (e.g., 1, 2, or 5 nm and up to 10, 20, 50, 100, 200, or 500 microns), or larger macroscale particles (e.g., at least 1 or 2 mm and up to 4 or 5 mm).

In a first set of embodiments, the powder is at least partly or entirely inorganic in its composition, i.e., the powder has an inorganic composition. The term "inorganic composition," as used herein, corresponds to any composition lacking carbon-hydrogen bonds. The inorganic composition may be, for example, a metal or metal alloy in elemental form, such as iron, titanium, cobalt, nickel, copper, zinc, aluminum, tin, silicon, tantalum, and alloys containing one or more of these elements; e.g., magnetic compositions (e.g., Sm—Co and alnico alloys); carbides, such as iron carbides (steels); and high-strength and/or corrosion-resistant materials (e.g., Ti—Al and Al—Ce alloys and intermetallics). The inorganic composition may alternatively be; for example, a metal oxide, such as an aluminum oxide, gallium oxide, indium oxide, silicon oxide (e.g., glass or sand), germanium oxide, tin oxide, indium tin oxide, yttrium oxide, titanium oxide, zirconium oxide, hafnium oxide, vanadium oxide, niobium oxide, tantalum oxide, chromium oxide, molybdenum oxide, tungsten oxide, manganese oxide, iron oxide ($Fe_2O_3$ or $Fe_3O_4$), cobalt oxide, nickel oxide, copper oxide, zinc oxide, or calcium titanium oxide ($CaTiO_3$). The inorganic composition may alternatively be, for example, a metal nitride, such as boron nitride, silicon nitride, silicon oxynitride, silicon carbide nitride, aluminum nitride, tantalum nitride, or zirconium nitride. The inorganic composition may alternatively be, for example, a metal boride, such as aluminum boride, titanium boride, cobalt boride, tantalum boride, or magnesium boride. In some embodiments, the powder has a ceramic composition, which may be an oxide, carbide, nitride, or boride material, such as any of the compositions exemplified above. In some embodiments, any one or more classes or specific types of inorganic compositions described above may be excluded. In some embodiments, the powder has a magnetic composition, such as a permanent or non-permanent magnetic composition. The magnetic composition may also be more specifically a ferrimagnetic, ferromagnetic, or paramagnetic composition. In some embodiments, one or more types (or all types) of magnetic powder compositions are excluded.

In a second set of embodiments, the powder is at least partly or entirely organic in its composition, i.e., the powder has an organic composition. The organic composition generally includes carbon-hydrogen (C—H) groups. Typically, the organic composition is an organic polymer, which may be a thermoplastic or thermoset. The organic polymer may be, for example, a polyolefin (e.g., polyethylene or polypropylene), polystyrene, polyvinyl additional polymer (e.g., PMMA, PVAc, PVA, or PAN), chlorinated polymer (polyvinylchloride), fluorinated polymer (e.g., PVDF or PTFE), polyester, polyamide, polyurethane, polyether sulfone, polycarbonate, phenol-formaldehyde, urea-formaldehyde, polyoxymethylene (polyacetal), polyethyleneimine, polybenzimidazole (PBI), polybenzoxazole, polyether ether ketone (PEEK), polymide, polyamide-imide, polyphenylene sulfide, polyphenylene oxide, polyarylsulfone, and polytetrahydrofuran. In some embodiments, any one or more classes or specific types of organic compositions described above may be excluded.

In the binder jetting method, an adhesive polymer (binder) is used to bind particles of a powder, as described above, in an additive manufacturing device to form a curable preform (green part) having a shape of the object to be manufactured. For purposes of the present invention, the adhesive polymer is an amine-containing polymer. The amine-containing polymer should contain at least some primary and/or secondary amine groups. In some embodiments, the amine groups are not attached to aromatic (e.g., phenyl) rings. The amine-containing polymer typically includes at least or more than 6, 7, 8, 9, 10, 11, or 12 amine groups, and, in many cases, at least or more than 15, 20, 25, 30, 40, 50, 60, 70, 80, 90, 100, or 120 amine groups. Some examples of such amine-containing polymers include the polyethyleneimines, polyvinylamine, amino-functionalized polysaccharides (e.g., chitosan), amino-functionalized polypeptides (e.g., polylysine), amine-functionalized polyethylene glycol, and amino-functionalized polysiloxanes. The amine-containing polymer typically contains at least or more than two, three, four, five, or more repeating units. The molecular weight (typically $M_w$, but may be $M_n$) of the amine-containing polymer is typically at least or more than 200 g/mole, such as a molecular weight of at least or more than 300, 400, 500, 600, 700, 800, 900, 1000, 1200, 1500, 1800, 2000, 2500, 3000, 3500, 4000, 5000, 7500, 10,000, 15,000, 20,000, 25,000, 30,000, 40,000, 50,000, 75,000, 100,000, 200,000, 300,000, 400,000, 500,000, or 1,000,000 g/mole, or a molecular weight within a range bounded by any two of the foregoing values.

In particular embodiments, the amine-containing polymer is a polyethyleneimine (PEI), which may have any of the molecular weights exemplified above. The PEI may be a linear PEI or a branched PEI. In some embodiments, the PEI is a branched PEI having the following structure:

(3)

wherein n is an integer of at least 1, such as a value of 1, 2, 3, 4, 5, 10, 15, 20, 30, 40, 50, 100, 150, 200, 250, 300, 400, or 500, or a value within a range bounded by any two of the foregoing values. The value of n may also correspond to any particular molecular weight selected from the above exemplified molecular weights. PEI is a flexible rubbery polymer with imine groups, which have been found to possess a high adhesion, and the branched structure reduces crystallinity of the polymer. In addition, the imine groups can interact with oxide surfaces, e.g. the surface of silica, which imparts strength to the green part.

The amine-containing polymer may or may not contain additional functional groups (i.e., in addition to the already present amine groups) that may function as additional metal-binding or crosslinking groups. Some examples of additional metal-binding groups include hydroxy (OH), ketone, and carboxylic acid (or carboxylate metal or ammonium salt) groups. The metal ion in the carboxylate metal salt may result in a mainly covalent or ionic interaction with the carboxylate group. Some examples of metal ions include the alkali metals (e.g., lithium, sodium, or potassium), the alkaline earth metals (e.g., magnesium, calcium, or strontium), and transition metals (e.g., first row transition metals; such as scandium, titanium, vanadium, chromium, manganese, iron, cobalt, nickel, copper, and zinc).

In some embodiments, the amine-containing polymer is not chemically crosslinkable with itself. In other embodiments, the amine-containing polymer contains additional functional groups (e.g., epoxide, carboxylate, vinyl, or aldehyde) that make the polymer crosslinkable with itself, in which case the polymer can undergo crosslinking during a curing step. The amine-containing polymer can be crosslinkable by, for example, containing functional groups that can crosslink in response to a crosslinking stimulus, such as heat, high energy electromagnetic radiation (e.g., ultraviolet light); or that can crosslink by contact with radical initiators, such as azobisisobutyronitrile, dicumyl peroxide, or benzoyl peroxide; or that can crosslink by exposure to air and/or UV over time. Such crosslinkable functional groups and polymers containing such crosslinking groups are well known in the art, such as generally described in U.S. Pat. No. 7,287,587. In other embodiments, the amine-containing polymer may or may not be mixed with another polymer that contains groups capable of crosslinking with the amine-containing polymer in response to any of the exemplary forms of stimuli provided above.

Generally, the amine-containing polymer described above is in liquid solution (i.e., is in admixture with a solvent) when the amine-containing polymer is fed and used in the binder jetting additive manufacturing device. The term "solvent," as used herein; refers to a liquid in which the amine-containing polymer is dissolved or suspended. The solvent may be liquid at room temperature (generally 18-30° C. or 20-25° C., or about 20, 22, or 25° C.) or, in the case of a higher melting solvent, the solvent may require heating to turn it into a liquid. The solvent can be any solvent known in the art and which does not interfere with the additive manufacturing process. The solvent may be, for example, a polar protic or aprotic solvent. The amine-containing polymer is typically included in the solution in a concentration of 1-30 wt %, e.g., 1, 2, 5, 7, 10, 12, 15, 18, 20, 22, 25, 27, or 30 wt %, or a concentration within a range bounded by any two of the foregoing values. The term "solvent" also includes the possibility of a single solvent or a mixture (solution) of two, three, or more solvents.

Some examples of polar protic solvents include water, the alcohols (e.g., methanol, ethanol, n-propanol, isopropanol, n-butanol, and 2-butoxyethanol), and polyols (e.g., ethylene glycol, propylene glycol, diethylene glycol, triethylene glycol, glycerol, triethanolamine, and N,N,N',N'-tetrakis(2-hydroxyethyl)ethylenedi amine). Some examples of polar aprotic solvents include sulfoxide solvents (e.g., dimethyl sulfoxide and ethyl methyl sulfoxide), amide solvents (e.g., N,N-dimethylformamide, N,N-diethylformamide, acetamide, dimethylacetamide, diethylacetamide, gamma-butyrolactam, N-methylpyrrolidone, and hexamethylphosphoramide), ketone solvents (e.g., acetone and 2-butanone), carbonate solvents (e.g., propylene carbonate, ethylene carbonate, butylene carbonate, and dimethyl carbonate), ester solvents (e.g., 1,4-butyrolactone, ethylacetate, ethylpropionate, and propylene glycol methyl ether acetate, i.e., PGMEA), and high-boiling ether solvents (e.g., diethylene glycol dimethyl ether (diglyme), triethylene glycol dimethyl ether (triglyme), tetraethylene glycol dimethyl ether (tetraglyme)). Any one or more of the foregoing solvents may be used alone or as a mixture (solution) of two or more solvents. In some embodiments, the solvent includes water (i.e., is aqueous-based) while in other embodiments the solvent does not include water (i.e., is non-aqueous-based). In some embodiments, a combination of mutually soluble solvents is used, such as water and one or more alcohols (e.g., water and one or more of methanol, ethanol, n-propanol, and isopropanol). In other embodiments, one or more classes or specific types of solvents, as provided above, are excluded. When a solvent is included, the preform may be subjected to a drying step after the dispensing step to form the preform and before a curing step, if included. The curing step may also function as a drying step. The purpose of the drying step is to remove all or nearly all of the solvent from the preform.

In particular embodiments, the amine-containing polymer is in the form of an aqueous-based solution when fed into and used in the binder jetting additive manufacturing device. The aqueous-based solution contains a solvent composed of at least water. The aqueous-based solution may contain one, two, or more co-solvents miscible with water, such as an alcohol that is miscible with water. The water may be present, with respect to the co-solvents, in an amount of, for example, 5, 10, 15, 20, 25, 30, 35, 40, 45, 50, 55, 60, 65, 70, 75, 80, 85, 90, or 95 wt % (or vol %). The amine-containing polymer is typically included in the aqueous solution in a concentration of 1-30 wt %, e.g., 1, 2, 5, 7, 10, 12, 15, 18, 20, 22, 25, 27, or 30 wt %, or a concentration within a range bounded by any two of the foregoing values. However, for purposes of the present invention and as further discussed below, the concentration of the amine-containing polymer in the solution is dependent on the molecular weight of the amine-containing polymer. The purpose of this dependency between concentration and molecular weight of the amine-containing polymer is to ensure that the resulting solution of the amine-containing polymer has a viscosity in a range of 2-2.5 mPa·s and a surface tension in a range of 25-45 mN/m at room temperature (generally 18-30° C. or 20-25° C., or about 20, 22, or 25° C.). The feed solution for a binder jetting process should be within the foregoing ranges in viscosity and surface tension in order for the feed solution to be printable by the binder jetting device.

In particular embodiments, when the amine-containing polymer has a molecular weight of 200-2000 g/mole, or a molecular weight of 500-2000 g/mole, or a molecular weight of 800-2000 g/mole, the amine-containing polymer is present in the aqueous-based solution in a concentration of 2-30 wt %, 2-27 wt %, 2-25 wt %, 2-22 wt %, 2-20 wt %, 2-18 wt %, 2-15 wt %, 3-30 wt %, 3-27 wt %, 3-25 wt %, 3-22 wt %, 3-20 wt %, 3-18 wt %, 3-15 wt %, 4-30 wt %, 4-27 wt %, 4-2.5 wt %, 4-22 wt %, 4-20 wt %, 4-18 wt %, 4-15 wt %, 5-30 wt %, 5-27 wt %, 5-25 wt %, 5-22 wt %, 5-20 wt %, 5-18 wt %, or 5-15 wt %. More specifically, if the amine-containing polymer has a molecular weight of at least 200 g/mole and less than 1300 g/mole, the amine-containing polymer is preferably present in the aqueous-based solution in a concentration of 2-30 wt %, 2-27 wt %, 2-25 wt %, 2-20 wt %, 3-30 wt %, 3-27 wt %, 3-25 wt %, 3-20 wt %, 4-30 wt %, 4-27 wt %, 4-25 wt %, 4-20 wt %, 5-30 wt %, 5-27 wt %, 5-25 wt %, or 5-20 wt %; if the amine-containing polymer has a molecular weight of at least 1300 g/mole and less than 2000 g/mole, the amine-containing polymer is preferably present in the aqueous-based solution in a concentration of 2-17 wt %, 2-18 wt %, 2-17 wt %, 2-16 wt %, 2-15 wt %, 3-2.0 wt %, 3-18 wt %, 3-17 wt %, 3-16 wt %, 3-15 wt %, 4-20 wt %, 4-18 wt %, 4-17 wt %; 4-16 wt %, 4-15 wt %, 5-20 wt %, 5-18 wt %, 5-17 wt %, 5-16 wt %, or 5-15 wt %; if the amine-containing polymer has a molecular weight of at least 2000 g/mole and less than 5000 g/mole, the amine-containing polymer is preferably present in the aqueous-based solution in a concentration of 2-17 wt %, 2-16 wt %, 2-15 wt %, 2-14 wt %, 2-13 wt %, 2-12 wt %, 2-11 wt %, 2-10 wt %, 3-17 wt %, 3-16 wt %, 3-15 wt %, 3-14 wt %, 3-13 wt %, 3-12 wt %, 3-11 wt %, 3-10 wt %, 4-17 wt %, 4-16 wt %, 4-15 wt %, 4-14 wt %, 4-13 wt %, 4-12 wt %, 4-11 wt %, or 4-10 wt %; if the amine-containing polymer has a molecular weight of at least 5000 g/mole and less than 10,000 g/mole, the amine-containing polymer is preferably present in the aqueous-based solution in a concentration of 1-15 wt %, 1-14 wt %, 1-13 wt %, 1-12 wt %; 1-11 wt %, 1-10 wt %, 1-8 wt %, 1-5 wt %, 2-15 wt %, 2-14 wt %, 2-13 wt %, 2-12 wt %; 2-11 wt %, 2-10 wt %, 2-8 wt %, 2-5 wt %, 3-15 wt %, 3-14 wt %, 3-13 wt %, 3-12 wt %; 3-11 wt %, 3-10 wt %, 3-8 wt %, or 3-5 wt %; if the amine-containing polymer has a molecular weight of at least 10,000 g/mole and less than 100,000 g/mole, the amine-containing polymer is preferably present in the aqueous-based solution in a concentration of 0.5-10 wt %, 0.5-9 wt %, 0.5-8 wt %, 0.5-7 wt %, 0.5-6 wt %, 0.5-5 wt %, 0.5-4 wt %, 0.5-3 wt %, 0.5-2 wt %, 0.5-1 wt %, 1-10 wt %, 1-9 wt %, 1-8 wt %, 1-7 wt %, 1-6 wt %, 1-5 wt %, 1-4 wt %, 1-3 wt %, 1-2 wt %, 2-10 wt %, 2-9 wt %, 2-8 wt %, 2-7 wt %, 2-6 wt %, 2-5 wt %, 2-4 wt %, 2-3 wt %, 3-10 wt %, 3-9 wt %, 3-8 wt %, 3-7 wt %, 3-6 wt %, or 3-5 wt %; and if the amine-containing polymer has a molecular weight of at least 100,000 g/mole and up to 1,000,000 g/mole, the amine-containing polymer is preferably present in the aqueous-based solution in a concentration of 0.1-5 wt % 0.1-4 wt %, 0.1-3 wt %, 0.1-2 wt %, 0.1-1 wt %, 0.1-0.5 wt %, 0.2-5 wt % 0.2-4 wt %, 0.2-3 wt %. 0.2-2 wt %, 0.2-1 wt %, 0.2-0.5 wt %, 0.5-5 wt % 0.5-4 wt %, 0.5-3 wt %, 0.5-2 wt %, 0.5-1 wt %, 1-5 wt % 1-4 wt %, 1-3 wt %, 1-2 wt %, 2-5 wt % 2-4 wt %, or 2-3 wt %.

The binder jetting process is described in detail in, for example, U.S. Pat. Nos. 10,040,216 and 6,036,777, the contents of which are herein incorporated by reference in their entirety. In the binder jetting process, a powder, as described above, is fed into an additive manufacturing device (AMD) as a build material. The powder is eventually dispensed as a layer of build material on a vertically movable platform within the additive manufacturing device. The binder, which is the amino-containing adhesive polymer described above, either alone or admixed with a solvent, as described above, is fed into the AMD separately from the powder so that the two components are not in contact when fed into the AMD. The binder is routed to a printhead positioned over the bed of powder. Based on instructions provided by a computer program, as generally provided by a computer-aided manufacturing (CAM) software package, the printhead is directed to dispense selectively positioned droplets of the binder onto the powder bed to form a first layer of the article being built. The printhead can be an ink jet printhead, as well known in the art. Thus, the droplets of the binder can be precisely positioned in various locations on the powder bed to form a first layer of the article being built. As well known in the art of binder jetting, once a first layer of the article is built, the platform holding the powder bed is lowered by an amount equivalent to a layer thickness. A subsequent layer of the object is built by spreading a new layer of powder and then selectively depositing a second set of selectively positioned droplets of the binder. The platform holding the powder bed is then lowered again by another layer thickness, more powder is spread, and the process is continued until a preform having the shape of the object to be built is produced. The preform is constructed of particles of the powder bonded together with the binder.

After producing the preform, as described above, the preform can be subjected to a curing step to remove the aqueous-based solvent, thereby hardening the object. The curing step also functions to establish stronger and permanent binding interactions between the binder and powder. In the event the amine-containing polymer is crosslinkable, the curing step may also function to cure the preform to form a crosslinked object. Generally, when heat is employed, the curing temperature is below the melting points of the binder and powder. In some embodiments, and depending on the chemical composition of the binder and powder, the curing temperature is at least 30° C., 40° C., 50° C., or 60° C. and up to 80° C., 100° C., 120° C., 150° C., 180° C., 200° C., 220° C., or 250° C., or within a range between any two of the foregoing temperatures. The curing time (i.e., the time the preform is subject to any of the above exemplary temperatures) is generally at least 1, 2, or 3 hours and up to 4, 5, 12, 15, 18, 24, 36, or 48 hours. The curing time is also dependent on the size of the part, with larger parts generally requiring longer curing times.

After the curing step, the object may or may not be subjected to a sintering step. In the case where a curing step is not used, the preform produced using the adhesive polymer in step (ii) may or may not be subjected to a sintering step. The sintering step generally employs a higher temperature than the curing step. As well known in the art, sintering can be achieved by subjecting the crosslinked or uncrosslinked preform to a suitably elevated temperature, but below the melting point of the powder, at which the particles in the powder become fused. Preferably, for purposes of the invention, the sintering process results in sufficient fusing to result in a robust (i.e., infrangible) object constructed of the powder. Notably, the sintering step is generally not used when the powder is heat-sensitive, as in the case of most magnetic compositions or low-melting compositions. In the sintering process, depending on the conditions and the type of binder used, the binder may either partly or completely volatilize or decompose, or may leave a residue of carbon. The shape of the object being built can include any of the level of detail made possible by binder jetting processes known in the art.

Another parameter in the method that can be selected is the binder (print) saturation, which is the percentage of voidspace (i.e., space between particles of the powder) occupied by the aqueous solution of the adhesive polymer. The binder jetting device typically includes one or more control features for selecting the binder saturation. For purposes of the present invention, the binder saturation may be 3-300%. In different embodiments, the binder saturation is about, at least, or above, for example, 3, 4, 5, 10, 15, 20, 25, 30, 40, 50, 60, 70, 80, 90, 100, 120, 150, 180, 200, 220, 250, 280, or 300%, or a binder saturation with a range bounded by any two of the foregoing values. Generally, although a greater binder saturation normally results in a cured product of higher strength, the method of the present invention can advantageously employ a substantially reduced binder saturation (e.g., of no more than 5, 10, or 15%) and result in a cured product having an unexpectedly high strength and/or Young's modulus. However, in cases where an exceptionally high strength is desired, a high binder saturation (e.g., at least 30, 40, 50, 60, 70, 80, 90, or 100%) may be desirable to provide such strength. The strength of the cured product may be, for example, at least or greater than 0.5, 0.6, 0.7, 0.8, 0.9, 1, 1.2, 1.5, 1.8, 2, 2.5, 3, 3.5, 4, 4.5, 5, 5.5, 6, 6.5, 7, 7.5, or 8 MPa. The Young's modulus of the cured product, may be, for example, at least or greater than 100, 120, 150, 180, 200, 220, 250, 280, 300, 350, 400, 450, or 500 MPa.

The amount of binder remaining in the cured product also affects the physical properties of the cured product. Generally, a higher level of binder left in the cured part results in a higher strength. However, there can be some adverse effects of binder remaining in the cured part. In particular, binder remaining in the cured product may be undesirably converted to carbon during a higher temperature post-curing process, such as sintering. The volatile compounds emanating from decomposition of the binder may also pose a health hazard to those operating the AM unit. Thus, in some embodiments, the binder is substantially removed from the cured part. The amine-containing binders disclosed herein are particularly advantageous in this respect since they are generally soluble in aqueous solution, i.e., water or water-organic solvent solutions, wherein the organic solvent is miscible with water (e.g., an alcohol). By virtue of the ability of the amine-containing polymers to be dissolved in water or aqueous solution, the method disclosed herein may include a post-cure washing step in which residual binder material is substantially removed. The amount of binder remaining in the cured and washed part may be no more than, for example, 5, 4, 3, 2, 1, or 0.5 wt %. The AM device can also advantageously be cleansed by simple means, i.e., by washing the parts of the AM device with water or an aqueous solution.

Examples have been set forth below for the purpose of illustration and to describe certain specific embodiments of the invention. However, the scope of this invention is not to be in any way limited by the examples set forth herein.

Examples

Binder Jet Printing Results Using a Polyethyleneimine (PEI) Adhesive Polymer

Binder Jet 3D printing requires a binder with specific viscosity and surface tension to be printable. The required viscosity is in the range of 2-25 mPa·s and the required surface tension is 25-45 mN/m. Various molecular weights (MWs) of PEI were investigated to determine the proper viscosity and surface tension for an experimental binder jet process. The example here includes PEI-800 ($M_w$ 800 g/mol, $M_n$ 600 g/mol), PEI-1300 (M 1300 g/mol, $M_n$ 1200 g/mol), PEI-2000 ($M_w$ 2000 g/mol, M 1800 g/mol), and PEI-750,000 ($M_w$ 750,000 g/mol, $M_n$ 60,000 g/mol). In general, it was found that higher MW PEI polymers provide a higher viscosity at a given concentration. To meet the required viscosity range for binder jet printing, the concentration of PEI was selected to be inversely proportional to the PEI molecular weight. Thus, the lower molecular weight PEI-800 can load more polymer into the solution (e.g., 25 wt % solution), while high molecular weight PEI (e.g., 750,000 g/mol) has to be in a lower concentration (5 wt % or less) to meet the jettable viscosity. Furthermore, the relationship between the concentration and viscosity for low molecular weight PEI (e.g., 800, 1300, or 2000 g/mol) were investigated. Tables 1 and 2, below, show the viscosities and surface tensions of a series of aqueous solutions of PEI polymers varying in MW and concentration. As particularly shown by the data in Table 2, even with the small difference in molecular weights, a significant impact in their viscosity was observed.

TABLE 1

Optimum concentration of PEI as function of the molecular weight

| $M_W$ (g/mol) | Concentration (wt %) | Viscosity (mPa · s) |
|---|---|---|
| 800 | 25 | 15.9 |
| 800 | 20 | 9.99 |
| 800 | 15 | 6.77 |
| 800 | 10 | 4.49 |
| 800 | 5 | 3.15 |
| 1300 | 10 | 4.97 |
| 1300 | 5 | 2.71 |
| 2000 | 10 | 5.22 |
| 2000 | 5 | 3.62 |
| 750000 | 5 | 10.4 |
| 750000 | 2.5 | 4.99 |

*Solvent Ratio $H_2O$/1-propanol = 75/25
*Surface Tension 25-35 mN/M

TABLE 2

Viscosity of PEI solution at higher concentration

| $M_W$ (g/mol) | Concentration (wt %) | Viscosity (mPa · s) |
|---|---|---|
| 800 | 50 | 159 |
| 800 | 40 | 60.7 |
| 1300 | 40 | 146 |
| 1300 | 25 | 25.6 |
| 2000 | 40 | 228 |
| 2000 | 25 | 35.1 |

*Solvent Ratio $H_2O$/1-propanol = 80/20

PEI-800 is a water-soluble, non-toxic commercially available polymer. The binder solution was prepared by mixing the appropriate volumes of PEI-800, 1-propanol, and water with a magnetic stir bar for 24 hours to make 25, 15, or 10 wt % binder in a 75:25 mass ratio water:1-propanol solution. The solution was stored at room temperature.

Test bars of 3.17×2.34×0.63 cm geometry were printed using a binder jet printer with an 80 pL print head. The binder solution was allowed to contact the print head for 12 hours before use.

The printhead wiper needed to be washed during printing more often than the standard rate, once every 2-5 layers of powder, as opposed to once every 12 layers. This only applies to binder jet printers that use a sponge type wiper. Bars were printed with varying saturation settings from 5-80% with a packing factor of 0.5, a layer thickness of 300 µm, and with no heat applied during printing. The majority of the bars were cured at 180° C. for 2 hours, except for the temperature study series in which the time and temperature are shown in Table 4 (later below). This study showed that depending on composition of binder curing time needs to be tailored accordingly. The bars were found to have excellent dimensional uniformity even at the higher saturations.

Mechanical tests were performed using an in-house prepared 3-point bend instrument. Tests were conducted using ASTM standard B312 (MPIF 15) for green part strength. The test bars were placed on pins that were 2.54 cm apart, and a center pin applied a compressive force at the rate of 2.54 min/min. The green strength (S) was calculated from the following formula, as indicated in the standard:

$$S = \frac{3PL}{2Wt^2}$$

where L is the distance between pins, P is the force at rupture, T is the width of bar, and t is the thickness of bar.

Analysis of the Mechanical Properties of Silica Bars Using PEI Adhesive Polymer

Figure 1:
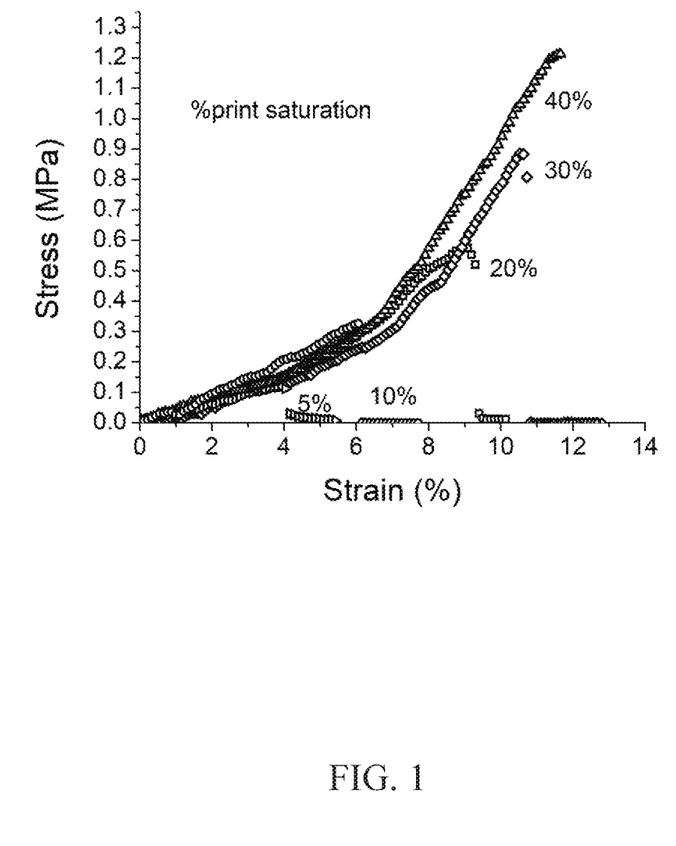
FIG. 1 is a stress-strain plot of silica bars produced by binder jet processing using PEI-800 (25 wt % in aqueous solution) as binder adhesive at 5%, 10%, 20%, 30%, and 40% hinder (print) saturations.

Bars were printed with PEI-800 adhesive polymer and silica powder in varied saturation, i.e. varied weight percent (wt %) in the parts. The stress-strain curves of selected samples from each saturation are shown in FIG. 1. The curves show a rupture at the yield point, indicating the samples are not malleable and snap rather than bend under constant force.

Figure 2A:
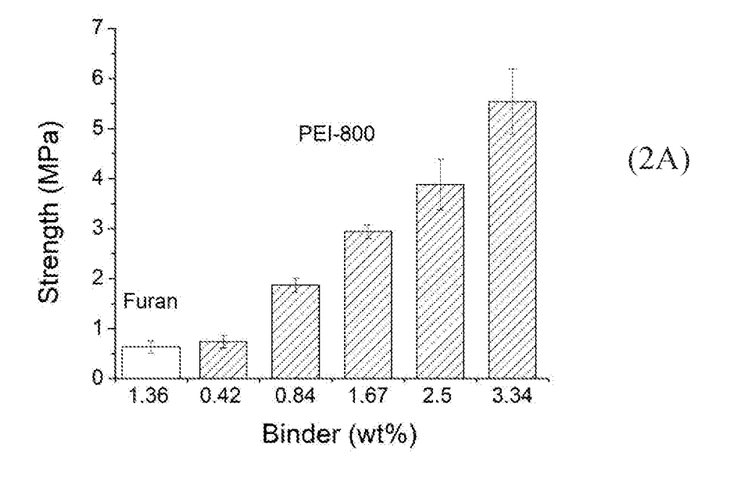
FIG. 2A is a plot of strength vs. binder content (in wt %) remaining in cured printed silica bars, as taken from the data in Table 3.
Figure 2B:
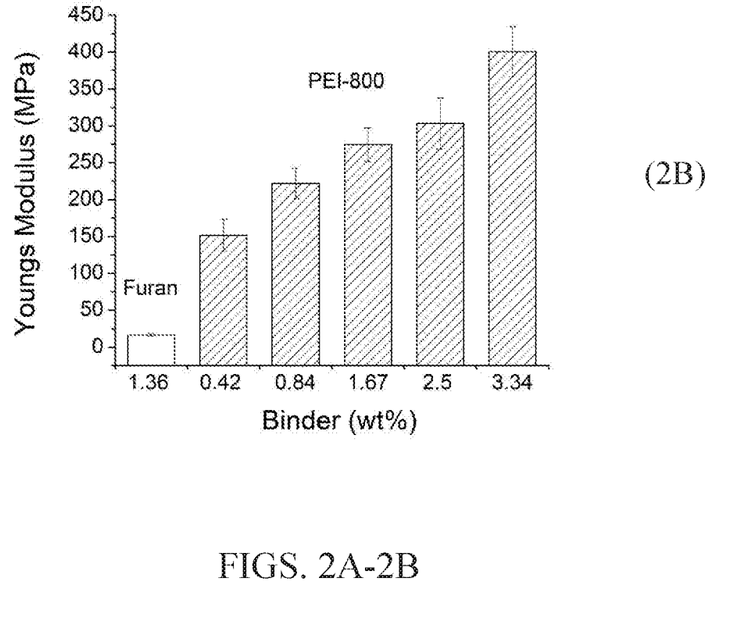
FIG. 2B is a plot of Young's modulus vs. binder content (in wt %) remaining in cured printed silica bars, as also taken from the data in Table 3. The silica bars were produced by binder jet processing using PEI-800 (25 wt % in aqueous solution) as binder adhesive at 5%, 10%, 20%, 30%, and 40% binder (print) saturations, and with furan resin (of the art) separately included for comparison.
Figure 3:
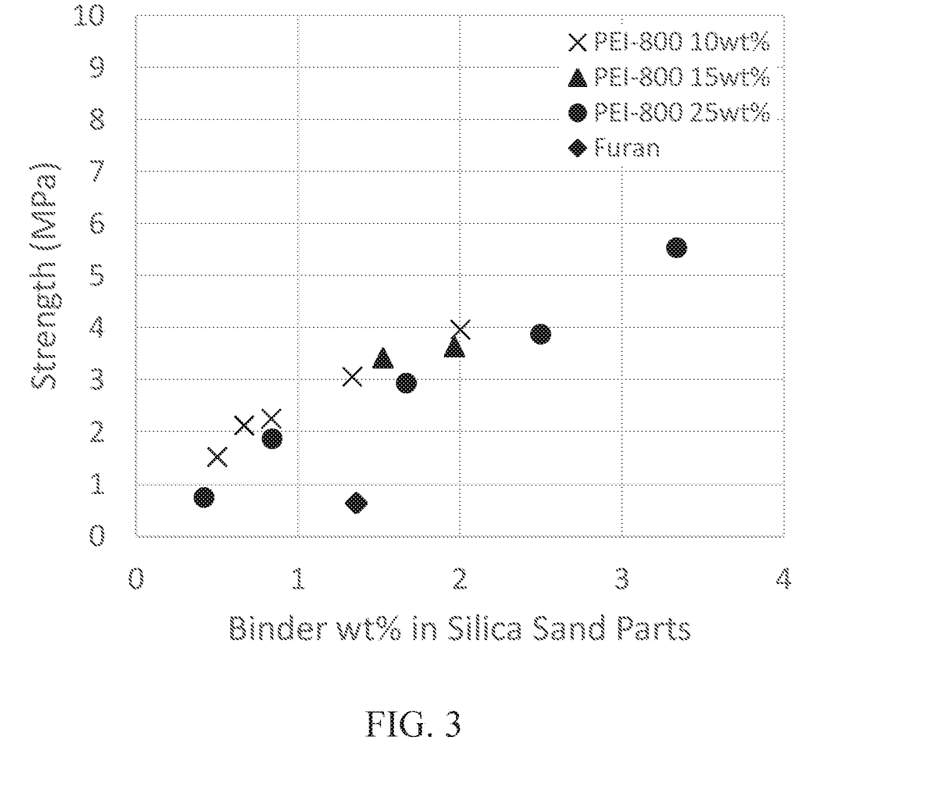
FIG. 3 is a plot of strength vs. the wt % of PEI-800 hinder in the part printed in silica sand.

Table 3 (below) summarizes (i) the binder content (in wt %) remaining in the cured printed samples, (ii) the strength (MPa), and (iii) the Youngs Modulus (MPa) of silica bars produced by binder jet processing using PEI-800 (25 wt % in aqueous solution) as binder adhesive at 5%, 10%, 20%, 30%, and 40% binder (print) saturations, and with furan resin (of the art) separately included in the table for comparison. FIG. 2A is a plot of strength vs. binder content (in wt %) remaining in the cured silica sand printed samples, as taken from the data in Table 3. FIG. 2B is a plot of Young's modulus vs. binder content (in wt %) remaining in the cured silica sand printed samples, as also taken from the data in Table 3. As shown by the data in Table 3, and as plotted in FIGS. 2A and 2B, PEI-800 at 5% saturation (0.42 wt % binder content) results in mechanical properties comparable to furan resin, but with only about one-third the polymer content. FIG. 3 shows a comparison of the strengths vs. wt % of binder solution across different saturations. Varying weight percents were printed to establish consistent parameters for printing. The successful printing as well as the strong mechanical strength of the cured silica sand from different PEI-800 binder solutions demonstrates the versatility and tunable capability of PEI-800 binder. As also shown, PEI-800 with 10% and 15% saturation and above (around 0.84 wt % binder content and above) results in significantly improved mechanical properties over furan resin.

TABLE 3

Comparison of furan resin and PEI-800 (5%-40% saturation) printed samples

| Binder/ Saturation | Binder Content (wt %) | Strength (MPa) | Youngs Modulus (MPa) |
| --- | --- | --- | --- |
| Furan Resin | 1.36 | 0.63 ± 0.12 | 16.8 ± 1.8 |
| PEI-800 5% | 0.42 | 0.74 ± 0.12 | 152 ± 21 |
| PEI-800 10% | 0.84 | 1.87 ± 0.14 | 222 ± 21 |
| PEI-800 20% | 1.67 | 2.94 ± 0.44 | 274 ± 23 |
| PEI-800 30% | 2.50 | 3.88 ± 0.50 | 303 ± 34 |
| PEI-800 40% | 3.34 | 5.54 ± 0.65 | 401 ± 34 |

Curing temperature is another factor that can influence the strength of the PEI-800 parts, as demonstrated by the data in Table 4 below. At a curing temperature of 150° C., the polymer is still flexible and somewhat malleable, resulting in a reduced Young's modulus and strength compared to samples cured at 180° C. At a curing temperature of 125° C. for 3 hours, the samples are very malleable and unable to undergo 3-point bend measurements.

TABLE 4

Youngs Modulus and Strength with different curing temperatures

| Print Saturation | Cure Temperatures (° C.) | Curing Time (h) | Youngs Modulus (MPa) | Strength (MPa) |
| --- | --- | --- | --- | --- |
| 20% | 200 | 2 | 274 ± 23 | 2.94 ± 0.14 |
| 20% | 150 | 2 | 7.39 ± 1.1 | 0.14 ± 0.02 |

Analysis of the Mechanical Properties of Steel Bars Using PEI Adhesive Polymer

Figure 4A:
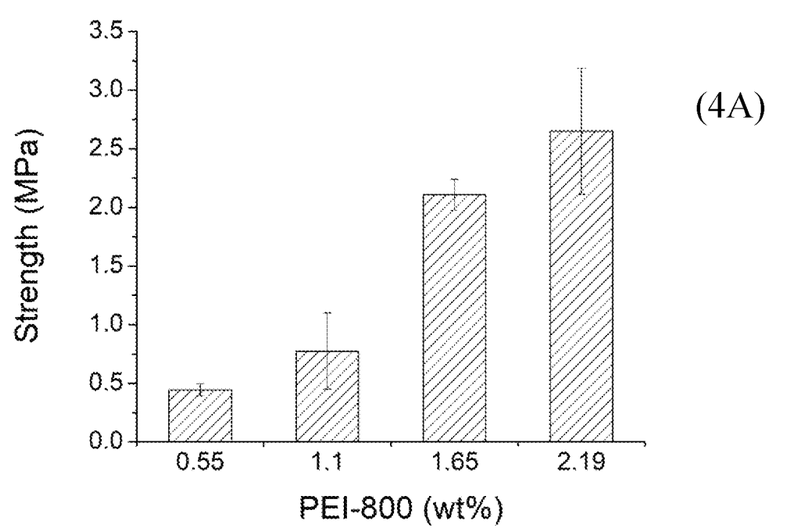
FIG. 4A is a plot of strength vs. binder content (in wt %) remaining in cured printed stainless steel bars, as taken from the data in Table 5.
Figure 4B:
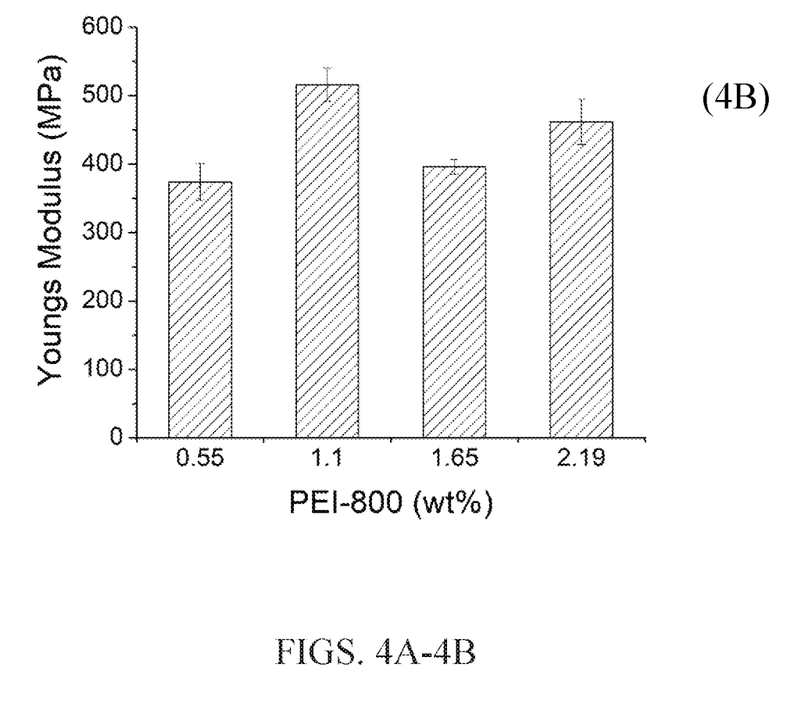
FIG. 4B is a plot of Young's modulus vs. binder content (in wt %) remaining in cured printed stainless steel bars, as also taken from the data in Table 5. The stainless steel bars were produced by binder jet processing using PEI-800 (25 wt % in aqueous solution) as binder adhesive at 30%, 40%, 60%, and 80% binder (print) saturations.
Figure 5:
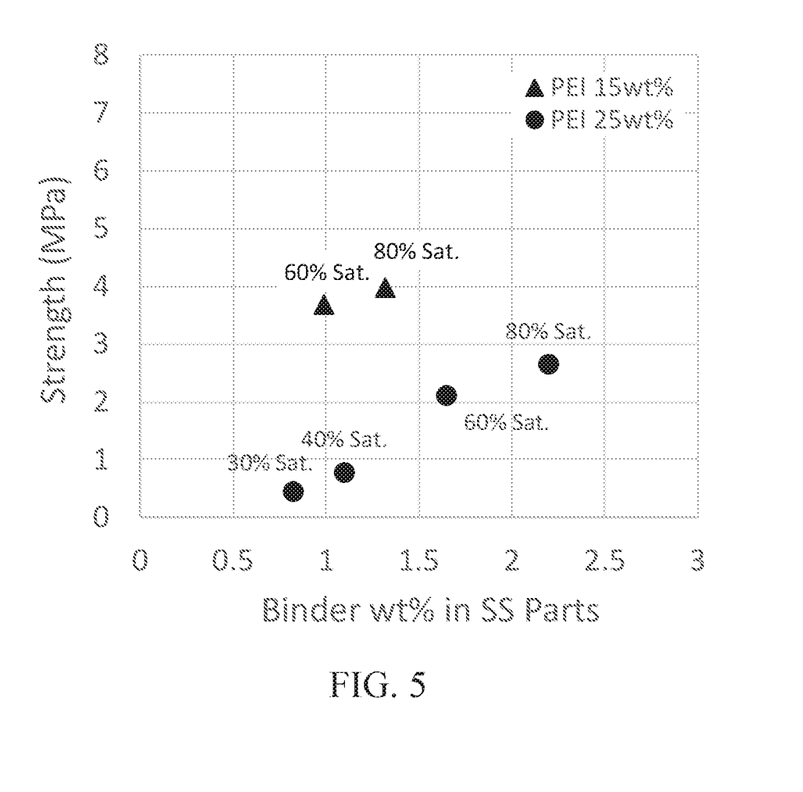
FIG. 5 is a plot showing the strength vs. the wt % of the PEI binder in the part printed in stainless steel.

Bars were printed with PEI-800 adhesive polymer and 420 stainless steel (SS) powder with varying wt % to establish consistent parameters to ensure the strongest part was produced. The bars were printed with 20% to 80% saturation, Table 5 (below) summarizes (i) the binder content (in wt %) remaining in the cured printed samples, (ii) the strength (MPa), and (iii) the Youngs Modulus (MPa) of stainless steel bars produced by binder jet processing using PEI-800 (25 wt % in aqueous solution) as binder adhesive at 30%, 40%, 60%, and 80% binder (print) saturations. FIG. 4A is a plot of strength vs. binder content (in wt %) remaining in the cured printed samples, as taken from the data in Table 5. FIG. 4B is a plot of Young's modulus vs. binder content (in wt %) remaining in the cured printed samples, as also taken from the data in Table 5. The data shows that stainless steel bars printed with PEI-800 adhesive polymer also exhibit excellent dimensional uniformity and mechanical properties. FIG. 5 is a comparison of two different wt % s of PEI comparing strength vs. polymer content. The successful printing was accomplished from the binder solutions with different PEI-800, and all the parts exhibited excellent dimensional uniformity. Probably due to a better created interface, the parts printed from PEI-800 15 wt % solution exhibited much higher mechanical strength, which indicates further tailorability of the PEI binder system.

TABLE 5

PEI-800 Stainless-steel 420 printed samples

| Binder/ Saturation | Binder Content (wt %) | Strength (MPa) | Youngs Modulus (MPa) |
| --- | --- | --- | --- |
| PEI-800 30% | 0.55 | 0.44 ± 0.05 | 374 ± 27 |
| PEI-800 40% | 1.10 | 0.77 ± 0.32 | 516 ± 24 |

TABLE 5-continued

PEI-800 Stainless-steel 420 printed samples

| Binder/<br>Saturation | Binder Content<br>(wt %) | Strength<br>(MPa) | Youngs Modulus<br>(MPa) |
|---|---|---|---|
| PEI-800 60% | 1.65 | 2.11 ± 0.13 | 396 ± 11 |
| PEI-800 80% | 2.20 | 2.65 ± 0.53 | 462 ± 32 |

While there have been shown and described what are at present considered the preferred embodiments of the invention, those skilled in the art may make various changes and modifications which remain within the scope of the invention defined by the appended claims.

What is claimed is:

1. A method for binder jetting additive manufacturing of an object, the method comprising:
   (i) separately feeding a powder from which said object is to be manufactured and a solution consisting of an adhesive polymer dissolved in a solvent into an additive manufacturing device, wherein said adhesive polymer is an amine-containing polymer having a molecular weight of at least 200 g/mole and is present in said solution in a concentration of 1-30 wt % to result in said solution having a viscosity of 2-25 mPa·s and a surface tension of 25-45 mN/m at room temperature; and
   (ii) dispensing selectively positioned droplets of said adhesive polymer, from a printhead of said additive manufacturing device, into a bed of said powder to bind particles of said powder with said adhesive polymer to produce a preform having a shape of the object to be manufactured.

2. The method of claim 1, wherein said amine-containing polymer is a polyethyleneimine.

3. The method of claim 2, wherein said polyethyleneimine is a branched polyethyleneimine.

4. The method of claim 3, wherein said branched polyethyleneimine has the following structure:

(1)

wherein n is at least 1.

5. The method of claim 1, wherein said solvent is aqueous-based.

6. The method of claim 1, wherein said solvent is non-aqueous-based.

7. The method of claim 1, wherein said dispensing step (ii) is followed by a curing step (iii) during which said solvent is removed.

8. The method of claim 7, wherein said curing step is conducted at a temperature within a range of 50-250° C. for a period of time of 1-48 hours.

9. The method of claim 1, wherein said dispensing step (ii) is followed by a sintering step in which particles in said preform are fused.

10. The method of claim 1, wherein said powder is sinterable.

11. The method of claim 1, wherein said powder has a metal oxide composition.

12. The method of claim 1, wherein said powder has a metallic composition.

13. The method of claim 1, wherein:
   if said amine-containing polymer has a molecular weight of at least 200 g/mole and less than 1300 g/mole, the amine-containing polymer is present in said aqueous-based solution in a concentration of 2-30 wt %;
   if said amine-containing polymer has a molecular weight of at least 1300 g/mole and less than 2000 g/mole, the amine-containing polymer is present in said aqueous-based solution in a concentration of 2-20 wt %;
   if said amine-containing polymer has a molecular weight of at least 2000 g/mole and less than 5000 g/mole, the amine-containing polymer is present in said aqueous-based solution in a concentration of 2-17 wt %;
   if said amine-containing polymer has a molecular weight of at least 5000 g/mole and less than 10,000 g/mole, the amine-containing polymer is present in said aqueous-based solution in a concentration of 1-15 wt %;
   if said amine-containing polymer has a molecular weight of at least 10,000 g/mole and less than 100,000 g/mole, the amine-containing polymer is present in said aqueous-based solution in a concentration of 0.5-10 wt %; and
   if said amine-containing polymer has a molecular weight of at least 100,000 g/mole and up to 1,000,000 g/mole, the amine-containing polymer is present in said aqueous-based solution in a concentration of 0.1-5 wt %.

14. The method of claim 1, wherein said amine-containing polymer has a molecular weight of 200-2000 g/mole and is present in said aqueous-based solution in a concentration of 2-30 wt %.

15. The method of claim 1, wherein said amine-containing polymer has a molecular weight of 200-2000 g/mole and is present in said aqueous-based solution in a concentration of 2-20 wt %.

16. The method of claim 1, wherein said amine-containing polymer has a molecular weight of 500-2000 g/mole and is present in said aqueous-based solution in a concentration of 2-25 wt %.

17. The method of claim 1, wherein said amine-containing polymer has a molecular weight of 500-1500 g/mole and is present in said aqueous-based solution in a concentration of 2-25 wt %.

18. The method of claim 1, wherein said amine-containing polymer has a molecular weight of 500-1200 g/mole and is present in said aqueous-based solution in a concentration of 2-25 wt %.

19. The method of claim 1, wherein said dispensing step (ii) is conducted at a binder saturation of 3-300%, wherein the binder saturation is the percentage of voidspace occupied by the aqueous solution of the adhesive polymer.

20. The method of claim 1, wherein said dispensing step (ii) is conducted at a binder saturation of 3-90%.

21. The method of claim 1, wherein said dispensing step (ii) is conducted at a binder saturation of 3-80%.

* * * * *